United States Patent [19]
Tsutsui

[11] Patent Number: 5,471,558
[45] Date of Patent: Nov. 28, 1995

[54] DATA COMPRESSION METHOD AND APPARATUS IN WHICH QUANTIZING BITS ARE ALLOCATED TO A BLOCK IN A PRESENT FRAME IN RESPONSE TO THE BLOCK IN A PAST FRAME

[75] Inventor: Kyoya Tsutsui, Kanagawa, Japan

[73] Assignee: Sony Corporation, Japan

[21] Appl. No.: 953,556

[22] Filed: Sep. 29, 1992

[30] Foreign Application Priority Data

Sep. 30, 1991 [JP] Japan ................. 3-276167

[51] Int. Cl.$^6$ ................. G10L 3/02; G10L 9/00
[52] U.S. Cl. ............ 395/2.28; 395/2.1; 395/2.38; 395/2.39; 395/2; 381/34
[58] Field of Search ................. 381/30, 31, 34, 381/36, 41, 43, 47; 395/2, 2.1, 2.28, 2.67, 2.71, 2.38

[56] References Cited

U.S. PATENT DOCUMENTS

| | | | |
|---|---|---|---|
| 5,222,189 | 6/1993 | Fielder | 395/2 |
| 5,268,685 | 12/1993 | Fujiwara | 381/30 |
| 5,294,925 | 3/1994 | Akagiri | 381/37 |

FOREIGN PATENT DOCUMENTS

| | | | |
|---|---|---|---|
| 0059294A1 | 9/1982 | European Pat. Off. | H04B 1/66 |
| 0064119A2 | 11/1982 | European Pat. Off. | H04B 1/66 |
| 0420745A3 | 9/1990 | European Pat. Off. | H04B 1/66 |
| 0421259A3 | 9/1990 | European Pat. Off. | H04B 1/66 |
| 0446031A2 | 3/1991 | European Pat. Off. | H04B 1/66 |
| 0421259A2 | 4/1991 | European Pat. Off. | H04B 1/66 |

OTHER PUBLICATIONS

1990 International Conference on Acoustics, Speech and Signal Processing, vol. 2, 3 Apr. 1990, New York, USA, pp. 1093–1096; Sigiyama et al.: "Adaptive Transform Coding with an Adaptive Block Size (ATC–ABS)".

*Primary Examiner*—Robert W. Downs
*Assistant Examiner*—Tariq Hafiz
*Attorney, Agent, or Firm*—Limbach & Limbach; Ian Hardcastle

[57] ABSTRACT

A digital input signal is compressed to provide a compressed output signal in a manner which prevents pre-echo, a common defect of data compressors. The digital input signal is divided in time into frames, and into at least one block of data in each frame. The frames include a past frame preceding a present frame. Block floating is applied to the data in the block in each frame. Quantizing bits are adaptively allocated to the data in the block in the present frame in response to the block in the past frame. Finally, the resulting quantized data is added to the compressed output signal. In a first variation, a signal energy or an allowable noise level is determined for the block in each frame. A word length is determined for the block in each frame in response to the determined signal energy or allowable noise level of the block. The quantizing bits are allocated to the data in the block in the present frame in response to the word length for the block in the past frame. In a second variation, a signal energy in the block in each frame is determined, and quantizing bits are adaptively allocated to the data in the block in the present frame in response to an interpolation between the signal energy for the block in the present frame and for the block in the past frame.

32 Claims, 10 Drawing Sheets

T1  T2  T3  T4

T1  T2  T3  T4 pe

DATA COMPRESSION METHOD AND APPARATUS IN WHICH QUANTIZING BITS ARE ALLOCATED TO A BLOCK IN A PRESENT FRAME IN RESPONSE TO THE BLOCK IN A PAST FRAME

FIELD OF THE INVENTION

The invention relates to an audio signal processing circuit for compressing a digital input signal to reduce the number of bits required to represent an analog information signal.

BACKGROUND OF THE INVENTION

A variety of techniques exist for digitally encoding audio or speech signals using bit rates considerably lower than those required for pulse-code modulation (PCM). In sub-band coding (SBC), a filter bank divides the frequency band of the audio signal into a plurality of sub bands. In sub-band coding, the signal is not formed into frames along the time axis prior to coding. In transform coding, a frame of digital signals representing the audio signal on the time axis is converted by an orthogonal transform into a block of spectral coefficients representing the audio signal on the frequency axis.

In a combination of sub-band coding and transform coding, digital signals representing the audio signal are divided into a plurality of frequency ranges by sub-band coding, and transform coding is independently applied to each of the frequency ranges.

Known filters for dividing a frequency spectrum into a plurality of frequency ranges include the Quadrature Mirror Filter (QMF), as discussed in, for example, R. E. Crochiere, *Digital Coding of Speech in Subbands*, 55 BELL SYST. TECH. J., No. 8, (1976). The technique of dividing a frequency spectrum into equal-width frequency ranges is discussed in Joseph H. Rothweiler, *Polyphase Quadrature Filters: A New Subband Coding Technique*, ICASSP 83 BOSTON.

Known techniques for orthogonal transform include the technique of dividing the digital input audio signal into frames of a predetermined time duration, and processing the resulting flames using a Fast Fourier Transform (FFT), discrete cosine transform (DCT) or modified DCT (MDCT) to convert the signals from the time axis to the frequency axis. Discussion of an MDCT may be found in J. P. Princen and A. B. Bradley, *Subband/Transform Coding Using Filter Bank Based on Time Domain Aliasing Cancellation*, ICASSP 1987.

In a technique of quantizing the spectral coefficients resulting from an orthogonal transform, it is known to use sub bands that take advantage of the psychoacoustic characteristics of the human auditory system. In this, spectral coefficients representing an audio signal on the frequency axis may be divided into a plurality of critical frequency bands. The width of the critical bands increases with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from a Modified Discrete Cosine Transform (MDCT), the spectral coefficient data generated by the MDCT within each of the critical bands is quantized using an adaptively-allocated number of bits.

Known adaptive bit allocation techniques include that described in IEEE TRANS. ON ACOUSTICS, SPEECH, AND SIGNAL PROCESSING, Vol. ASSP-25, No. 4 (1977, August) in which bit allocation is carried out on the basis of the amplitude of the signal in each critical band. This technique produces a flat quantization noise spectrum and minimizes noise energy, but the noise level perceived by the listener is not optimum because the technique does not effectively exploit the psychoacoustic masking effect.

In the bit allocation technique described in M. A. Krassner, *The Critical Band Encoder: Digital Encoding of the Perceptual Requirements of the Auditory System*, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

Block floating is a normalization process applied to a block of data comprising plural words, such as a block of plural spectral coefficients. Block floating is applied by multiplying each word in the block by a common value for the block to improve quantization efficiency. In a typical block floating process, the maximum absolute value of the words in the data block is found and is used as a block floating coefficient common to all the words in the data block. Using the maximum absolute value in the band as the block floating coefficient prevents data overflow because the absolute value of no other word in the data block can be greater than the maximum absolute value. A simplified form of block floating determines the block floating coefficient using a shift quantity, which provides block floating in 6 dB steps.

A system for compressing an input audio signal using an audio signal processing method that includes block floating is likely to suffer from a phenomenon known as pre-echo. Pre-echo seriously impairs the sound quality obtained when the compressed digital signal is subsequently expanded, decoded, and reproduced.

Pre-echo manifests itself when there is a transient in the audio input signal being coded, i.e., when the amplitude of the audio input signal increases rapidly. Pre-echo occurs when the transient in the audio input signal occurs part-way in the time frame subject to block floating, especially when the transient occurs towards the end of the frame. The coding system sets a quantization noise level that remains constant during each frame according to the maximum signal level in the frame. This quantization noise level is inappropriate for the part of the frame occurring before the transient, when the signal level is not high enough the mask the quantization noise level. As a result, quantization noise is audible before the transient occurs.

Pre-echo is not heard in the latter part of the frame after the transient because of the psychoacoustic property of the human sense of hearing called "masking." Masking is a psychoacoustic phenomenon in which a signal is rendered inaudible, or "masked," by other signals occurring simultaneously with, or slightly earlier than, or later than, the signal. Masking effects may be classed into time axis masking effects, that is, masking by signals occurring earlier or later than the masked signal, and concurrent masking effects, which is masking is by simultaneously-occurring signals having a frequency different from the frequency of the masked signal. Backward temporal masking, i.e., masking by a high level sound of noise occurring before the high-level sound, has a considerably shorter duration than forward temporal masking, i.e., masking by a high level sound of noise occurring after the high level sound has ceased.

Masking enables a signal to render inaudible any noise within its time or frequency masking range. This means that a digital coding system that produces quantizing noise may have quantizing noise levels that are high compared with the noise level that is allowable in the absence of a signal provided that the quantizing noise lies within the masking range of the signal. Since relatively high levels of quantizing noise are allowable if masked by the signal, the number of bits required to represent the signal, or parts of the signal, may be significantly reduced.

A critical band is a measure of the range of frequencies that can be masked by a signal. A critical band is the band of noise that can be masked by a pure signal that has the same intensity as the noise and has a frequency in the middle of the critical band. The width of successive critical bands increases with increasing frequency of the pure signal. The audio frequency range of 0 Hz to 20 kHz is normally divided into, e.g., 25 critical bands.

FIG. 7 shows a digital representation of an audio signal containing a transient in which the level of the audio signal rapidly increases. The digital signal is divided into frames that include a predetermined number of samples, i.e., the frames T1 through T4, and block floating is applied. If the digital signal subsequent to compression by block floating is expanded, decoded, and reproduced, the quantization noise level in the part of the frame T2 prior to the transient is too high to be masked by the signal level in that part of the frame T2, and pre-echo will be audible.

FIG. 9 shows a schematic arrangement of a conventional audio signal processing apparatus for compressing the digital signal representing an audio signal. The signal processing apparatus processes a digital input signal by a method in which the input digital signal is divided in time into frames of a predetermined number of samples, each frame of samples in the time domain is orthogonally transformed into a block of spectral coefficients in the frequency domain, block floating is applied to each block of spectral coefficients, each block of spectral coefficients is quantized by adaptive bit allocation, and the quantized signals are transmitted simultaneously with parameters relevant to block floating and adaptive bit allocation. The process by which pre-echo is caused will next be described in connection with the arrangement shown in FIG. 9.

In FIG. 9, the frames of the digital audio input signal TS in the time domain are fed into the input terminal 101. Each frame of the input digital signal TS is transformed in plural spectral coefficients SP by the orthogonal transform circuit 111. The spectral coefficients SP are transmitted to the spectral coefficient quantization circuit 115.

The spectral coefficient quantization circuit 115 normalizes the spectral coefficients SP by block floating, and then quantizes the normalized spectral coefficients SP with an adaptively allocated number of bits.

Each block of spectral coefficients SP resulting from transforming one frame of the input signal is also supplied to the block floating coefficient calculating circuit 113, which calculates at least one block floating coefficient SF for each block, and provides the block floating coefficients SF to the spectral coefficient quantization circuit 115. The spectral coefficient quantization circuit then carries out block floating on each block using the block floating coefficient SF received from the block floating coefficient calculating circuit 113. The spectral coefficients may divided into bands, a block floating coefficient may be calculated for each band, and block floating may be applied to the spectral coefficients in each band.

The spectral coefficients SP are also supplied to the bit allocation calculating circuit 114 which provides a word length WL that indicates the number of bits to be used by the spectral coefficient quantization circuit 115 for quantizing the spectral coefficients. The number of bits used for quantizing determines the quantizing noise level: increasing the number of bits reduces the quantizing noise level. The number of quantizing bits is calculated in response to an allowable noise level calculated from the energy level in each block of spectral coefficients SP, taking masking into consideration.

Quantized spectral coefficients QSP produced by processing each block of spectral coefficients with block floating in response to the block floating coefficient SF, and by quantizing each block of spectral coefficients with a number of bits adaptively allocated in response to the word length WL, are fed from the spectral coefficient quantization circuit 115 to the bit stream converting circuit 116. The bit stream converting circuit converts the quantized spectral coefficients QSP, the block floating coefficient SF, and the word length WL, for each block into a bit stream. The output of the bit stream converting circuit is provided as an output bit stream to the output terminal 102.

FIG. 10 shows a practical arrangement of the bit allocation calculating circuit 114. Each block of spectral coefficients SP is supplied via the terminal 141 to the energy calculating circuit 145 which determines the energy distribution. This can involve determining the energy distribution among the critical bands. The output of the energy calculating circuit 145, the energy level EN, is supplied to the allowable noise level calculating circuit 146, which determines the allowable noise level AN for each block in response to the energy distribution found by the energy calculating circuit 145, and taking masking into account.

The output of the allowable noise level calculating circuit 146, the allowable noise level AN, is supplied to the word length calculating circuit 147, which also receives the block floating coefficient SF from the block floating coefficient calculating circuit 113 via the terminal 143. The word length calculating circuit 147 determines the word length WL, indicating the number of allocated bits, from the value of the block floating coefficient for each respective block.

FIG. 11 shows the units to which block floating is applied. Each unit is represented by a rectangle. Block floating is applied to each unit produced by dividing along the frequency axis and the time axis. The division along the time axis represents the division of the input signal into frames. The division along the frequency axis represents a division of the spectral coefficients resulting from the orthogonal transform of one frame of the input signal into one or more bands, preferably into 25 critical bands. Thus, each rectangle shown in FIG. 11 represents a block consisting of one band of the spectral coefficients resulting from transforming one frame of the input signal.

For example, for each of the four successive frames of the input signal shown in FIG. 11 (frames T1 through T4), the bit allocation calculating circuit 114 performs a set of processing operations to determine the number of bits to allocate for quantizing the spectral coefficients in the each of the blocks B1 through B4, each of the blocks B1 through B4 being a block in one band of the spectral coefficients resulting from transforming the frames TI through T4, respectively, of the input signal.

FIG. 12 shows how the bit allocation calculating circuit 114 adaptively allocates bits to the blocks B1 through B4 in the four successive frames T1 through T4, respectively, of the audio signal shown in FIG. 7. The bit allocation calculating circuit 114 finds the energy levels EN1 through EN4 in the blocks B1 through B4, respectively. From the respective energy levels, the bit allocation calculating circuit calculates the allowable noise levels AN1 through AN4, in response to the energy levels EN1 to EN4. The bit allocation calculating circuit 114 also calculates the word length WL and the value of the block floating coefficient SF for each for the blocks B1 through B4 from the respective allowable noise levels AN1 through AN4.

Referring to FIGS. 7 and 12, since the signal level in the latter part of the frame T2 is considerably greater than the signal level in the former part, the energy level EN2 of the block B2, and the allowable noise level calculated in response to the energy level EN2, i.e., is the quantizing noise level masked by the energy level EN2, are determined in response to the energy level in the latter part of the frame. As a result, the number of bits allocated for quantizing the spectral coefficients SP in the block B2, i.e., the number of bits indicated by the word length WL2, is allocated such that the quantization noise level in the block B2 is below the allowable noise level AN2, determined in response to the high energy level EN2 in the latter part of the frame.

The signal level is low in the former part of frame T2, as shown in FIG. 7, so the allowable noise level AN21 in the former part of the frame T2, as shown in FIG. 13, should be a relatively low value. On the other hand, the signal level in the latter part of the frame T2 is considerably greater than in the former part, shown in FIG. 7, so the allowable noise level AN22 of the block B22 corresponding to the latter part of the frame T2 has a considerably higher value, as shown in FIG. 13. FIG. 13 also shows energy levels EN21 and EN22 in the blocks B21 and B22 corresponding to the former part and the latter part of the frame T2, for the input signal shown in FIG. 7.

Because of the differences in energy level and allowable noise level between the two parts of the frame T2, as shown in FIG. 13, if the number of bits allocated for quantizing the block B2 is determined in the manner shown in FIG. 12, the quantizing noise level is set at a level that exceeds the allowable noise level AN21. This level of quantizing noise is audible as pre-echo in the former part of the frame T2 shown in FIG. 13 (in the block B21).

It is known to select the duration of a frame to be as short as possible to reduce the possibility of pre-echo. This reduces the time during which pre-echo can occur, which renders pre-echo inaudible by taking advantage of backward masking. In backward masking, a low level sound or noise is masked by a later occurring loud sound. Backward temporal masking operates over a relatively short time span. If the low level sound or noise persists for more than a millisecond or so before the loud sound occurs, the high level sound will not mask the noise or low level sound, and the noise or low-level sound will be heard by the listener. Backward temporal masking is to be contrasted with forward temporal masking in which a high level sound masks a low level sound or noise that occurs after the high level sound has ceased. Forward temporal masking operates over a considerably longer time span than backward temporal masking.

Reducing the duration in time of a frame, i.e., reducing the number of samples in a frame, to take advantage of backward temporal masking is undesirable because reducing the frame duration reduces the efficiency of the data compressor. The duration of a frame cannot be reduced far enough for backward masking to be relied upon while providing an acceptable compression efficiency.

It is also known to vary the duration of a frame such that the duration is shortened only in those frames in which the signal level increases rapidly. Since block floating is performed on the block of spectral coefficients resulting from transforming into the frequency domain a frame of the input digital signal in the time domain, it is not possible to vary the frame duration over too wide a range because of the window shape applied when performing the transform. Moreover, reducing the length of the frame reduces the resolution in the frequency domain. Thus, pre-echo cannot be reduced beyond a certain limit by temporarily reducing the duration of the frame.

It is also known to detect frames in which there is a rapid increase in signal level, and to allocate redundant bits to such frame in an attempt to reduce quantizing distortion. However, in such a method, it has proved difficult to decide correctly how many redundant bits should be allocated.

OBJECTS AND SUMMARY OF THE INVENTION

It is an object of this invention to provide an audio signal processing method for compressing a digital audio signal that prevents impairment of sound quality resulting from pre-echo, For accomplishing the above object, the present invention provides a signal processing apparatus for compressing a digital input signal to provide a compressed output signal, The apparatus includes an input signal dividing circuit that divides the digital input signal in time into frames and into at least one block of data in each frame. The frames include a past frame preceding a present frame. A block floating circuit applies block floating to the data in the at least one block in each frame. A bit allocation circuit adaptively allocates quantizing bits to the data in the at least one block in the present frame to provide quantized data. The bit allocation circuit adaptively allocates the quantizing bits in response to at the least one block in the past frame. Finally, the apparatus includes an output circuit that adds the quantized data to the compressed output signal.

In a first variation, the apparatus additionally comprises a circuit for determining either a signal energy or an allowable noise level of the at least one block in the frame. A circuit determines a word length in response to the determined one of the signal energy and the allowable noise level of the at least one block in the frame. The bit allocation circuit adaptively allocates quantizing bits in response to the word length for the at least one block in the past frame.

In a second variation, the apparatus includes a circuit that determines the signal energy in the at least one block in each frame, and the bit allocation circuit adaptively allocates the quantizing bits in response to an interpolation between the signal energy in the at least one block in the present frame and the signal energy in the at least one block in the past frame.

In a further variation, the input signal dividing circuit additionally includes a circuit for providing a control signal that has a first state when a frame includes a transient, and that otherwise has a second state. The bit allocation circuit adaptively allocates quantizing bits to the data in the at least one block in the present frame in response to the at least one block in the past frame when the control signal is in the first state, and in response to the at least one block in the present frame when the control signal is in the second state.

In a method according to the invention for compressing a digital input signal to provide a compressed output signal, the digital input signal is divided in time into frames, and into at least one block of data in each frame. The frames include a past frame preceding a present frame. Block floating is applied to the data in the at least one block in each frame. Quantizing bits are adaptively allocated to the data in the at least one block in the present frame to provide quantized data. The quantizing bits are adaptively allocated in response to the at least one block in the past frame. Finally, the quantized data is added to the compressed output signal.

In a first variation on the method according to the invention, a signal energy or an allowable noise level is determined for the at least one block in each frame. A word length is determined for the at least one block in each frame in response to the determined signal energy or allowable noise level of the at least one block in each frame. The quantizing bits are allocated to the data in the at least one block in the present frame in response to the word length for the at least one block in the past frame.

In a second variation, a signal energy in the at least one block in each frame is determined, and quantizing bits are adaptively allocated to the data in the at least one block in the present frame in response to an interpolation between the signal energy for the at least one block in the present frame and the signal energy for the at least one block in the past frame.

In a further variation, the step of dividing the input signal additionally includes providing a control signal having first state when a frame includes a transient, and otherwise has a second state. Quantizing bits are adaptively allocated to the data in the at least one block in the present frame in response to the at least one block in the past frame when the control signal is in the first state, and in response to the at least one block in the present frame when the control signal is in the second state.

The invention also includes a medium for storing a compressed signal derived from an input signal by the method according to the invention.

In the audio signal processing apparatus and method of the present invention, bit allocation to the at least one block in the present frame is determined in response to the signal energy or the allowable noise level of the at least one block in a past frame preceding or immediately preceding the present frame. For this reason, bit allocation to the at least one block in a present frame that includes a transient is made in response to the lower signal energy or allowable noise level of the at least one block in the past frame preceding the present frame. As a result, more bits are allocated to the at least one block in the present frame, which reduces quantizing distortion.

In addition, since the total number of bits allocated for quantizing the at least one block over a time period of several frames is made constant, bit surplus or deficit may be avoided.

In addition, when the total number of bits allocated for quantizing the at least one block over a time period of several frames is made constant, block floating is performed on a variable length time frame. The total number of bits allocated is made constant if a shorter frame is selected, and signal impairment otherwise caused by a constant bit rate may be avoided.

DETAILED DESCRIPTION OF THE INVENTION

Figure 1:
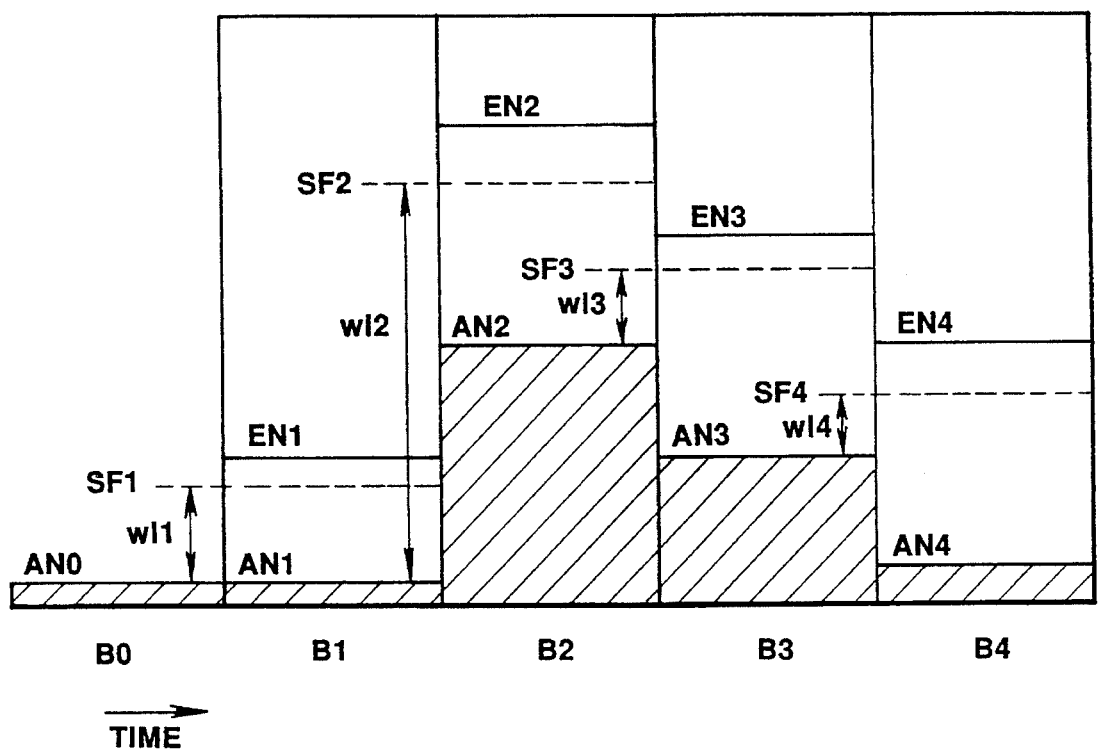
FIG. 1 shows how quantizing bits are adaptively allocated in the apparatus and according to the method of the present invention.

Referring to the drawings, certain preferred embodiments of the present invention will be described in detail.

Referring to FIG. 1, the present invention consists of an audio signal processing method in which a digital audio input signal TS, is divided in time into blocks, e.g., blocks B1 through B4, each block corresponding to a frame, e.g., frames T1 through T4, respectively, of the input signal. Block floating is applied to the data in each block. The data in each block is quantized with an adaptively-allocated number of bits. The resulting quantized data for each block is included in the compressed output signal together with the parameters relevant to block floating for the block, i.e., the block floating coefficient SF1 and the word length w1 for the block. In the coding method according to the invention, quantizing bits are allocated to a block in the present frame in response to the signal energy level EN or to the allowable noise level AN in the block in at least one past frame preceding or immediately preceding the present frame.

In the signal processing method of the present invention, if the present frame is the frame T2, the number of bits allocated for quantizing the data the block B2 in the frame T2, (i.e., the number of bits indicated by the word length w10 (not shown) and w11) is determined in response to the energy levels EN0 (not shown) or EN1 or to the allowable noise levels AN0 or AN1 in the blocks B0 or B1 in the frames T0 or T1, preceding the frame T2. Preferably, in the data compressing method of the present invention, if the present frame is the frame T2, the number of bits allocated for quantizing the data in the block B2 in the frame T2, (i.e., the number of bits indicated by the word length w11) is determined in response to the energy level EN1 or the allowable noise level AN1 in the block B1 in the frame T1, immediately preceding the frame T2.

Referring to FIG. 1, in a second audio signal processing method according to the present invention, a frame (for example, the frame T2 in FIG. 1) that includes a transient signal, in which the signal level increases rapidly, is detected. Bit allocation (i.e., the number of bits indicated by the word length w10 or w11 ) to data in the block B2 in the frame T2 is determined in response to the signal energies EN0 or EN1, or EN1, or the allowable noise levels AN0 or AN1, or AN1, in at least one of the blocks B0 or B1, in the frames T0 or T1, preceding the frame T2, or in the block B1 in the frame T1, immediately preceding the frame T2.

Figure 12:
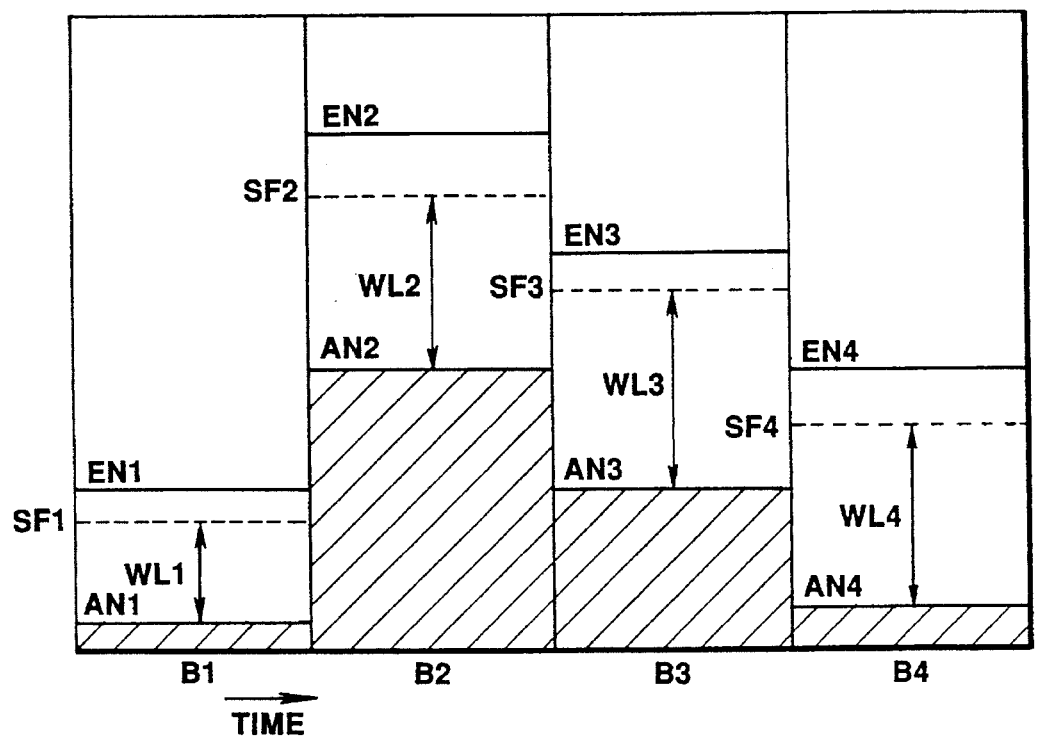
FIG. 12 is a diagram showing how quantizing bits are adaptively allocated in the conventional method.
Figure 13:
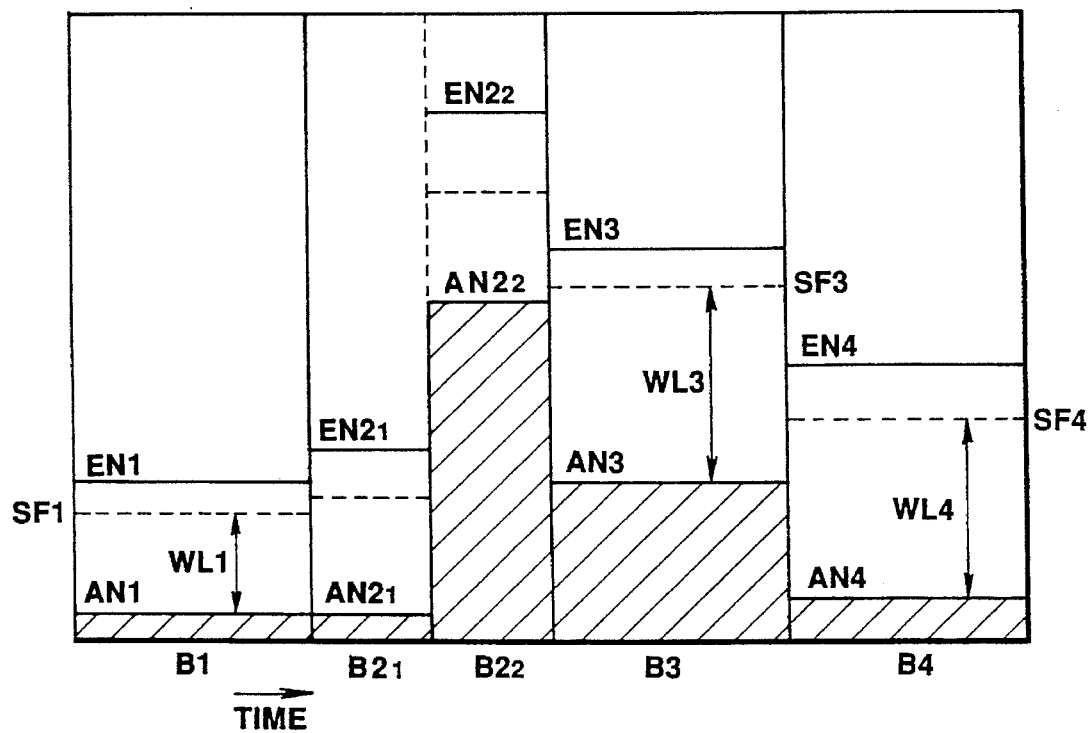
FIG. 13 a diagram for illustrating the problem inherent in the conventional signal processing method.

In the data compressing method and apparatus according to the present invention, it is not the allowable noise levels AN1 through AN4 of the blocks B1 through B4, but the allowable noise level AN of the immediately preceding block, as shown in FIG. 1, that is used to determine the word lengths WL1 through WL4 of the blocks B1 through B4, as shown in FIG. 12. For example, in the block B1, the word length w11 is determined in response to the allowable noise level AN0 in the immediately preceding block B0. Similarly, in the blocks B2, B3, and B4, the word lengths w12, w13 and w14 respectively are set using the allowable noise level AN1 of the block B1, the allowable noise level AN2 of the block B2, and the allowable noise level AN3 of the block B3, respectively.

In the manner just described, in the block B2 of FIG. 1, in which the signal level rapidly increases, since the word length w12 is calculated using the value of the low allowable noise level AN1 of the block B1, a number of bits that is large enough to prevent pre-echo from being heard in the former part of the frame T2, where the signal level is low, is allocated for quantizing the data in the block B2.

If, in the example of FIG. 1, the energy level EN1 in the block B1, immediately preceding the block B2, is increased, the allowable noise level in the block B1 is also increased, so that the number of bits allocated for quantizing the data in the block B2 decreases. However, this decrease in the number of bits does not cause audible pre-echo because the quantization noise in the block B2 is inaudible due to forward masking by the increased-level signal in the frame T1. The later-occurring quantizing noise is masked by the earlier-occurring sound.

In the present embodiment, although fewer bits are allocated to the blocks B3 and B4 that occur after the block B2, than with the conventional method described above, the resulting higher quantizing noise level in blocks B3 and B4 is not perceived by the listener as pre-echo because of forward masking by the higher-level signal in the preceding frame T2.

It can be seen from above that the audio signal processing method of the present invention is effective for processing transient signals, that is signals in which the level rapidly increases. However, the audio signal processing method of the present invention is also effective for processing steady-state signals.

Figure 2:
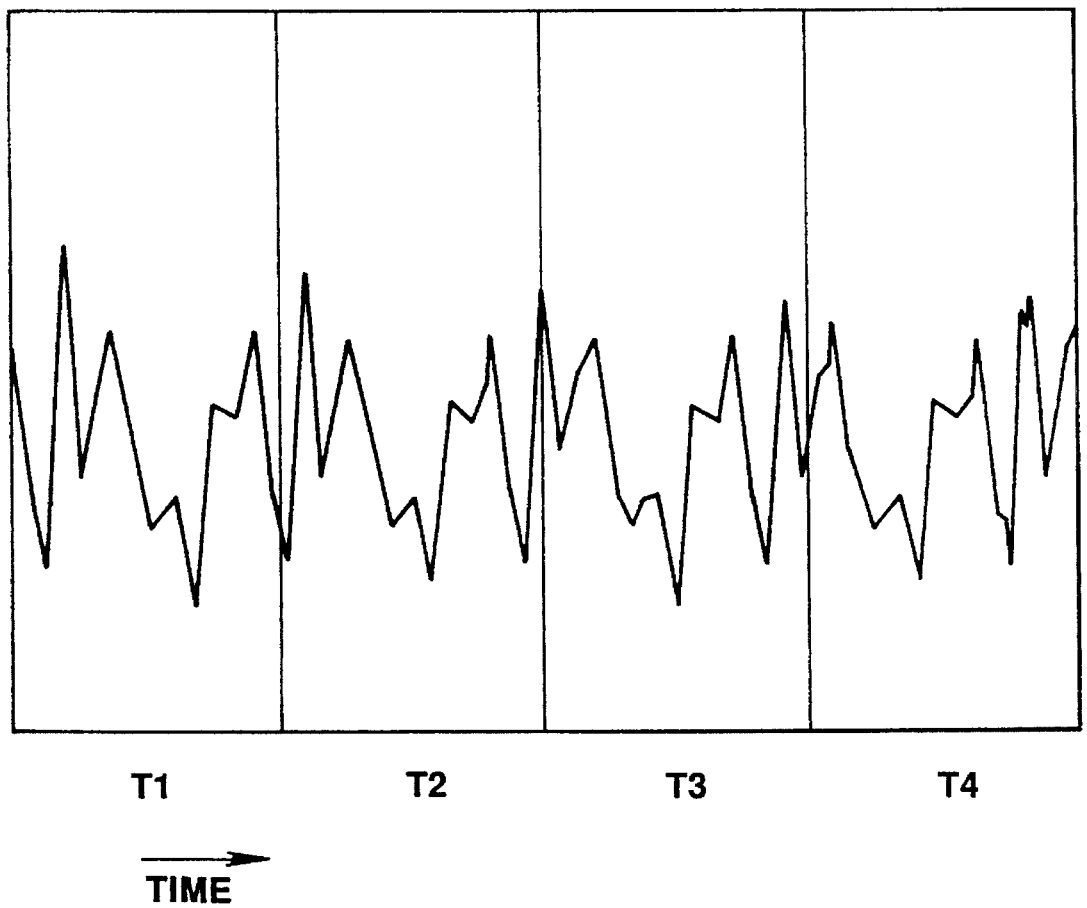
FIG. 2 is a waveform diagram showing a steady-state signal.
Figure 3:
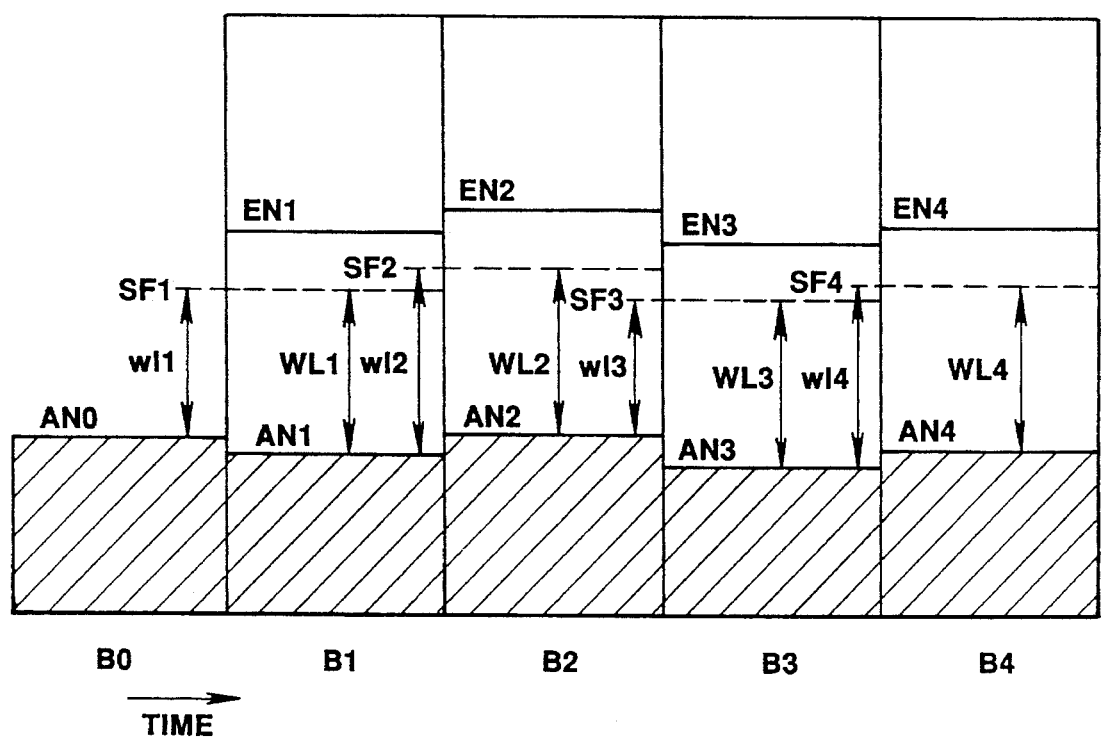
FIG. 3 shows how quantizing bits are adaptively allocated to steady-state signals in the apparatus and according to the method of the present invention.

When processing a steady-state audio signal SP, shown for example in FIG. 2, the energy levels EN1 through EN4, the allowable noise levels AN0 through AN3, the block floating coefficients SF1 through SF4 and the word lengths w11 through w14 for blocks B1 through B4, respectively, are as shown in FIG. 3. FIG. 3 also shows, for comparison, word lengths WL1 through WL4 determined in response to the block floating coefficients SF1 through SF4 and the allowable noise levels AN1 through AN4 of blocks B1 through B4, respectively.

It can be seen from FIG. 3 that, for the steady-state input signal shown in FIG. 2, the allowable noise levels AN1 through AN4 of blocks B1 through B4, have substantially the same values as the allowable noise levels AN0 through AN3 in the immediately preceding blocks B0 through B3. Therefore, the results obtained when the word lengths WL1 through WL4 are calculated for blocks B1 through B4 are practically the same as the word lengths w11 through w14 calculated using the allowable noise level in the immediately preceding blocks B0 through B3. Thus, it may be seen that the audio signal processing method of the present invention may be directly applied to steady-state signals. Since all types of input audio signals may be processed in the same way, the arrangement of a system for carrying out the audio signal processing method may be simplified.

However, if it is desired to find the word lengths for the blocks B1 through B4 for steady-state signals, it is preferred to use the allowable noise levels AN1 through AN4 for blocks B1 through B4 because a higher sound quality may thereby be obtained. For this reason, it is also possible, and is sometimes preferable, to detect a frequency range having a rapidly increased signal level to apply the signal processing only according to the invention only to this frequency range.

The input signal may be tested, from time-to-time, to determine whether it is a transient signal or a steady-state signal. When the input signal is determined to be a steady-state signal, a frame having a longer-than-normal (i.e. a frame having the duration of plural normal frames) can be selected. In this case, it is preferred to find the word length in response to the allowable noise level for the duration of the larger frame to achieve the highest sound quality.

Although the word length w1 for the block in the present frame is preferably calculated using the allowable noise level for the block in the immediately preceding frame, the word length may also be calculated using an interpolated value between the allowable noise level for the block in the immediately preceding frame and the allowable noise level for the block in the present frame, i.e., the block for which the word length is being calculated.

Alternatively, the word length for the block in the present frame may also be determined in response to an allowable noise level determined from an energy value of the block in the present frame calculated from the data in the block in the preceding frame. As a further alternative, the word length of the block in the present frame may also be determined in response to an allowable noise level determined from energy values for the block in the present frame obtained by interpolating the energy level of the block in the present frame and that of the block in the preceding frame.

The method of the present invention may be applied to both fixed bit rate and variable bit rate systems. If the method is applied to a fixed bit rate system, since more bits may be allocated to a block in which the signal level rapidly increases, it is preferred to arrange a plurality of temporally consecutive blocks into a group and to carry out bit rate adjustment for the group of blocks.

In the manner described above, the present invention provides an audio signal processing method in which bit allocation to one or more blocks in the present frame is determined in response to the energy level EN or the allowable noise level AN in the respective blocks in the past frames preceding or immediately preceding the present frame. Bit allocation to at least one block in a frame that includes a transient, in which the signal level rapidly increases, for example, block B2 in frame T2, is determined in response to the energy levels EN0 or EN1, or EN1, or the allowable noise levels AN0 or AN1, or AN1, in the blocks B0 or B1 in the past frames T0 preceding or T1 immediately preceding the frame T2. The present invention also provides for the total number of quantizing bits allocated to the blocks during a time period corresponding to the duration of several frames of the input audio signal to be made constant, or the total number of quantizing bits allocated during a time period corresponding to several frames of the input to be made constant by varying to length of the frame to which block floating is applied.

Figure 4:
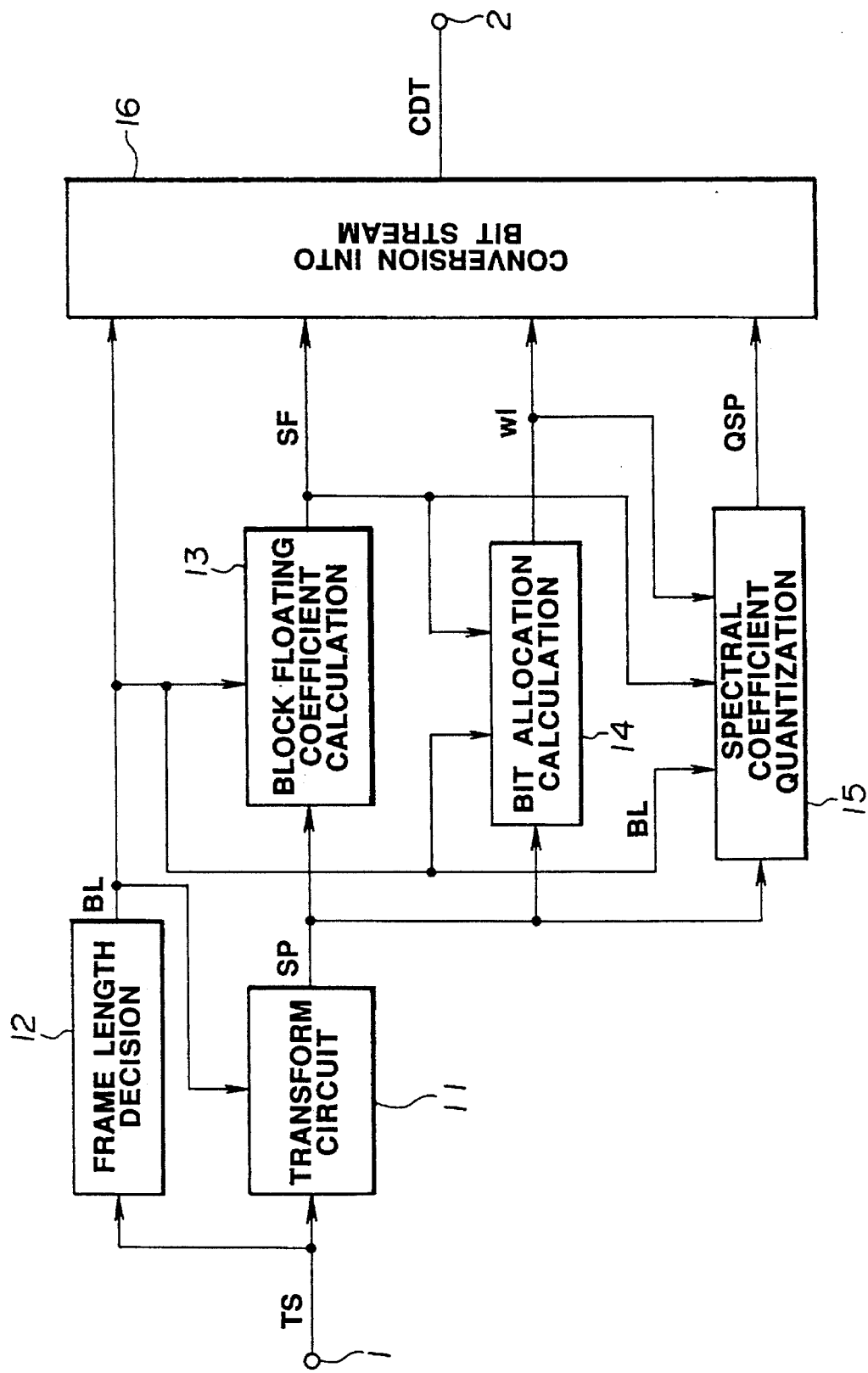
FIG. 4 is a block circuit diagram showing a practical arrangement of an apparatus according to the present invention for carrying out the method according to the present invention.

FIG. 4 shows a practical arrangement of the apparatus according to the invention for carrying out the audio data compressing method according to the invention. In this, the duration of a frame is selected depending on whether the input signal is transient or steady-state. The arrangement shown in FIG. 4 transforms a frame of plural samples of a digital audio input signal TS in the time domain into plural spectral coefficients SP in the frequency domain.

The digital audio input signal TS, which is divided in time into frames each consisting of a predetermined number of samples, is fed into the input terminal 1. The input signal TS is transformed into plural spectral coefficients SP by the transform circuit 11.

The frame length decision circuit also receives the input signal TS and determines a variable frame length, i.e., the number of samples of the input signal in each frame. This also determines the timing between the blocks B1 through B4. Preferably, the variable frame length is obtained by dividing a basic frame by 1, 2, 4, etc. The frame length BL is supplied from the frame length decision circuit 12 to the transform circuit 11, the block floating coefficient calculation circuit 13, the bit allocation calculating circuit 14, the spectral coefficient quantization circuit 15, and the bit stream conversions circuit 16.

The transform circuit 11 transforms the input signal TS in the time domain into spectral coefficients SP in the frequency domain. The transform is carried out on frames of the input signal having a frame length determined by the frame length BL.

The spectral coefficients SP from the transform circuit 11 are fed into the spectral coefficient quantization circuit 115 for quantizing. The spectral coefficient quantization circuit 15 normalizes the spectral coefficients SP by block floating, and quantizes the normalized spectral coefficients SP with an adaptively allocated number of bits.

Each block of spectral coefficients SP resulting from transforming one frame of the input signal is also supplied to the block floating coefficient calculating circuit 13, which calculates at least one block floating coefficient SF for each block of spectral coefficients, and provides the block floating coefficients to the spectral coefficient quantization circuit 15. The spectral coefficients may be divided into plural bands, preferably critical bands, and block floating applied to each band. The block floating coefficient calculating circuit 13 also receives frame length data BL from the frame length decision circuit 12 so that it can determine the block floating coefficient for the length of frame determined by the frame length decision circuit. The spectral coefficient quantization circuit 15 also receives frame length data from the frame length decision circuit 12 so that it can correctly apply block floating.

The spectral coefficients SP are also supplied to the bit allocation calculating circuit 14, which provides a word length WL that indicates the number of bits to be used by the spectral coefficient quantizing circuit 15 for quantizing the spectral coefficients. The number of bits is calculated in response to the allowable noise level, which is determined by the energy level in block of spectral coefficients SP, taking masking into consideration. The bit allocation calculating circuit 14 also receives the frame length data BL required for it to determine the number of bits to be allocated for quantizing the spectral coefficients.

The quantized spectral coefficients QSP produced by processing each block of spectral coefficients with block floating in response to the block floating coefficient SF, and by quantizing with the number of bits allocated in response to the word length w1, is fed from the spectral coefficient quantizing circuit 15 to the bit stream converting circuit 16.

The bit stream converting circuit 16 converts the quantized spectral coefficients QSP, the block floating coefficient SF, and the word length w1 for each block into a bit stream. The output of the bit stream converting circuit is provided as an output bit stream to the output terminal 2.

The resulting compressed digital output can then be transmitted or recorded on a suitable recording medium for later reproduction and decoding. Examples of suitable recording media are magneto-optical discs, optical discs, magnetic tapes, and semiconductor memories.

Figure 5:
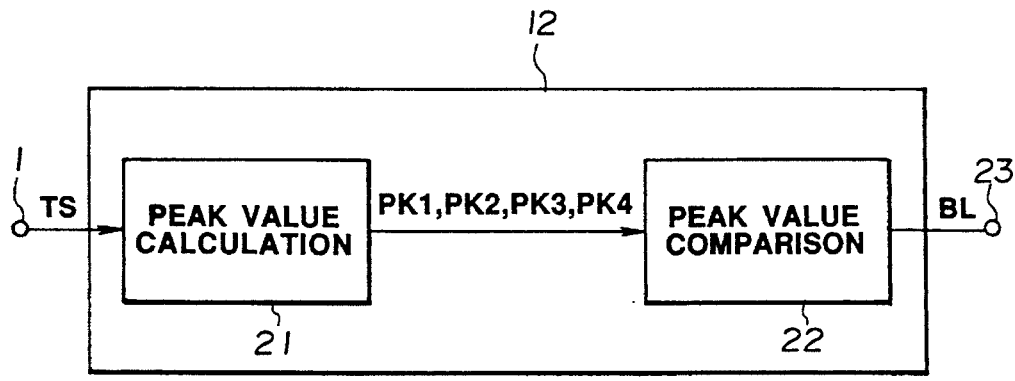
FIG. 5 is a block circuit diagram showing a practical arrangement of a frame length decision circuit employed in the arrangement shown in FIG. 4.
Figure 10:
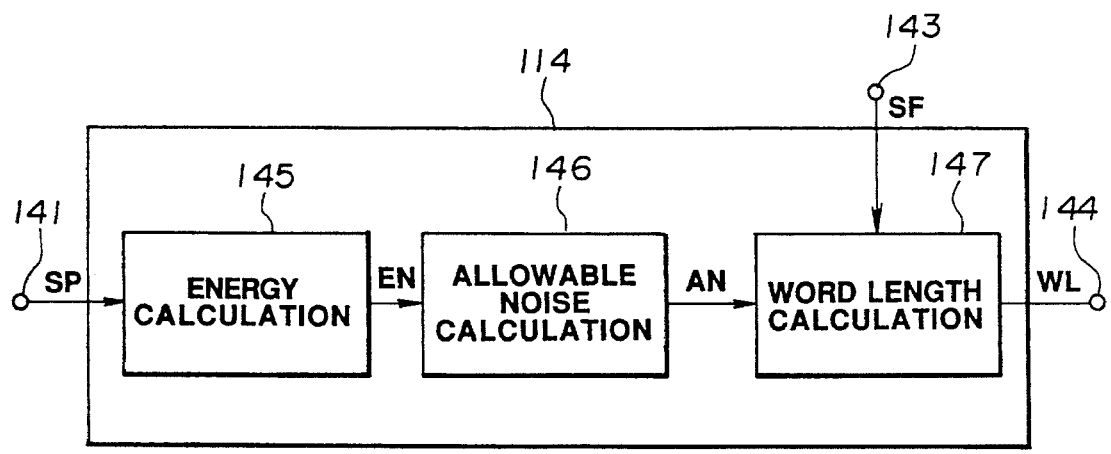
FIG. 10 is a block circuit arrangement showing a practical arrangement of the bit allocation calculating circuit employed in the arrangement of FIG. 9.

FIG. 5 shows a practical arrangement of the frame length decision circuit 12. The digital audio input signal TS is supplied via the input terminal 1 to the peak value calculating circuit 21, where a peak value PK1 through PK4 for each of the respective frames T1 through T4, respectively, of the input signal TS is found. The output of the peak value calculating circuit 21 is supplied to the peak value comparator circuit 22. The peak value comparator circuit decides, in response to the output of the peak value calculating circuit 21, whether the input signal TS is a steady-state signal or a transient signal.

If the input signal is determined to be a steady-state signal, the peak value comparator circuit 22 provides a frame length BL indicating a long frame length, i.e., a frame having a long duration. Preferably, the frame length BL indicates that the basic frame is not to be divided.

If the input signal is determined to be a transient signal, the peak value comparator circuit 22 provides a frame length BL indicating a short frame length, i.e., a frame having a short duration. Preferably, the frame length BL indicates that the basic frame is to be divided by two, four, or more.

The frame length BL is fed to the output terminal 23.

Figure 6:
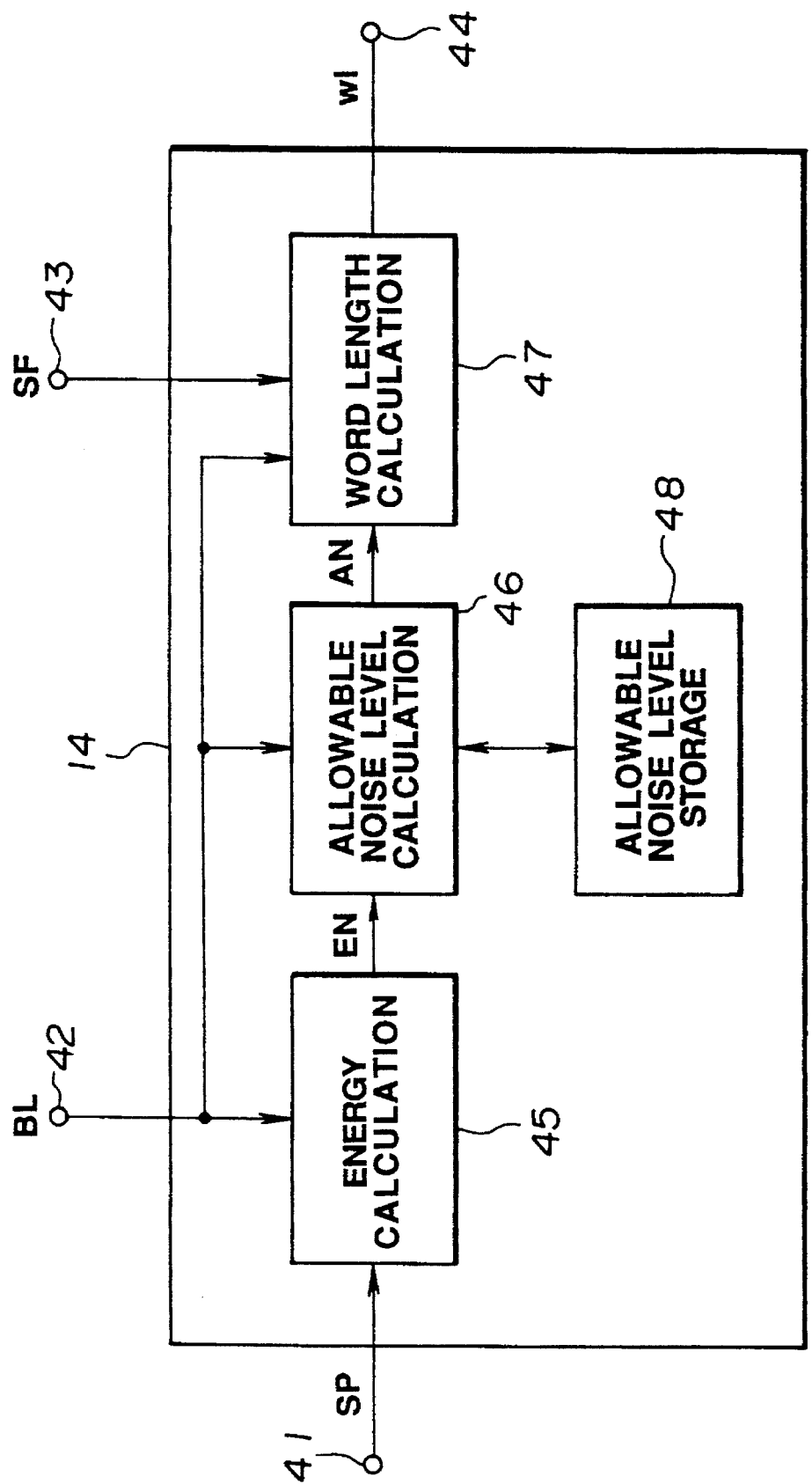
FIG. 6 is a block circuit diagram showing a practical arrangement of a bit allocation calculating circuit employed in the arrangement shown in FIG. 4.
Figure 7:
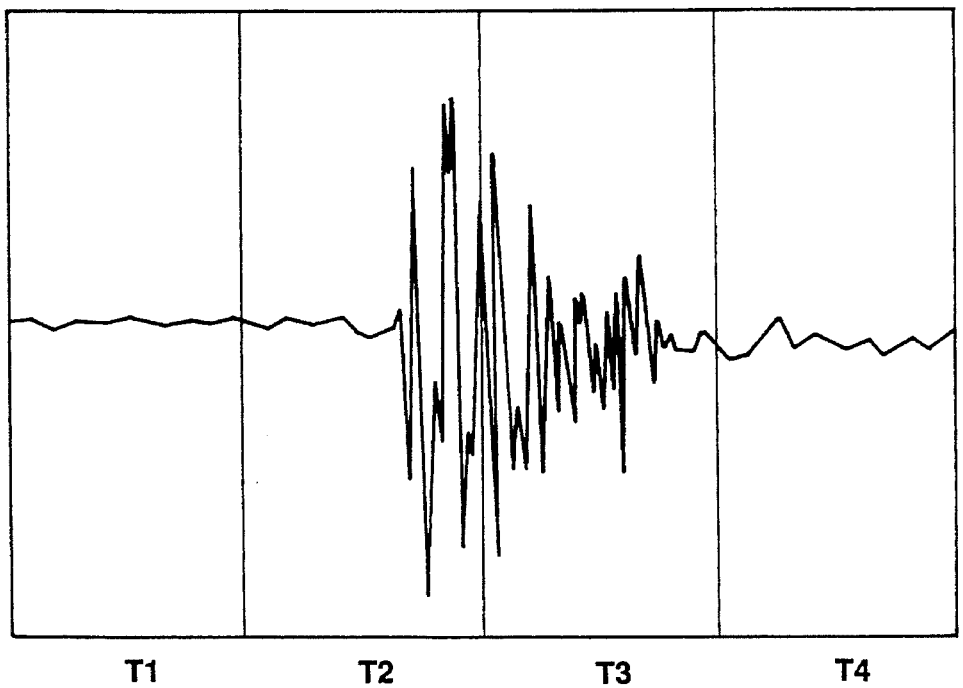
FIG. 7 is a waveform diagram showing a transient
Figure 8:
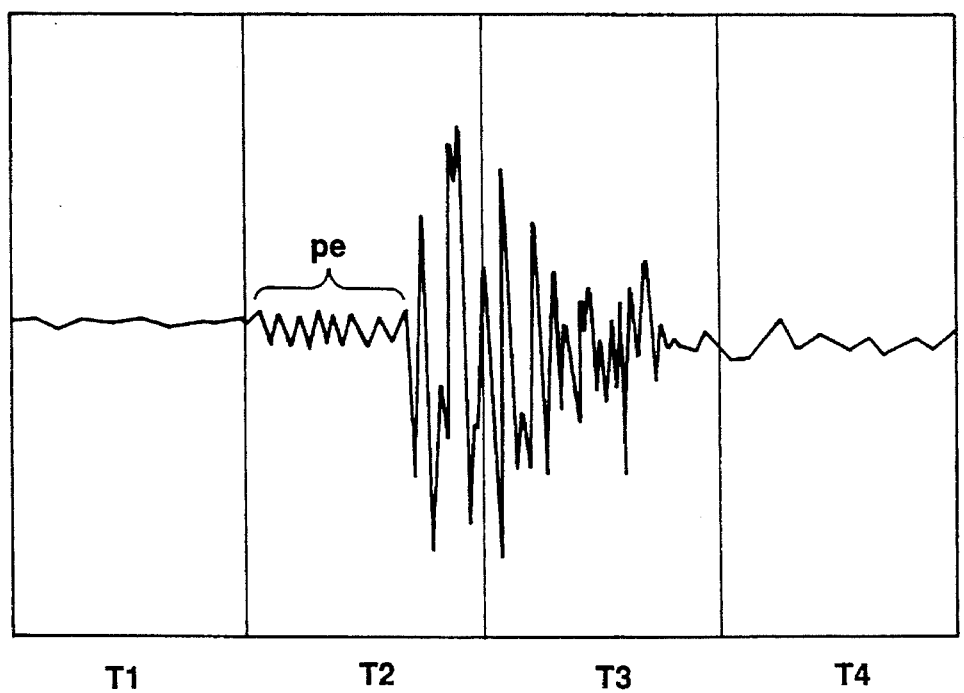
FIG. 8 is a waveform diagram for explaining pre-echo.
Figure 9:
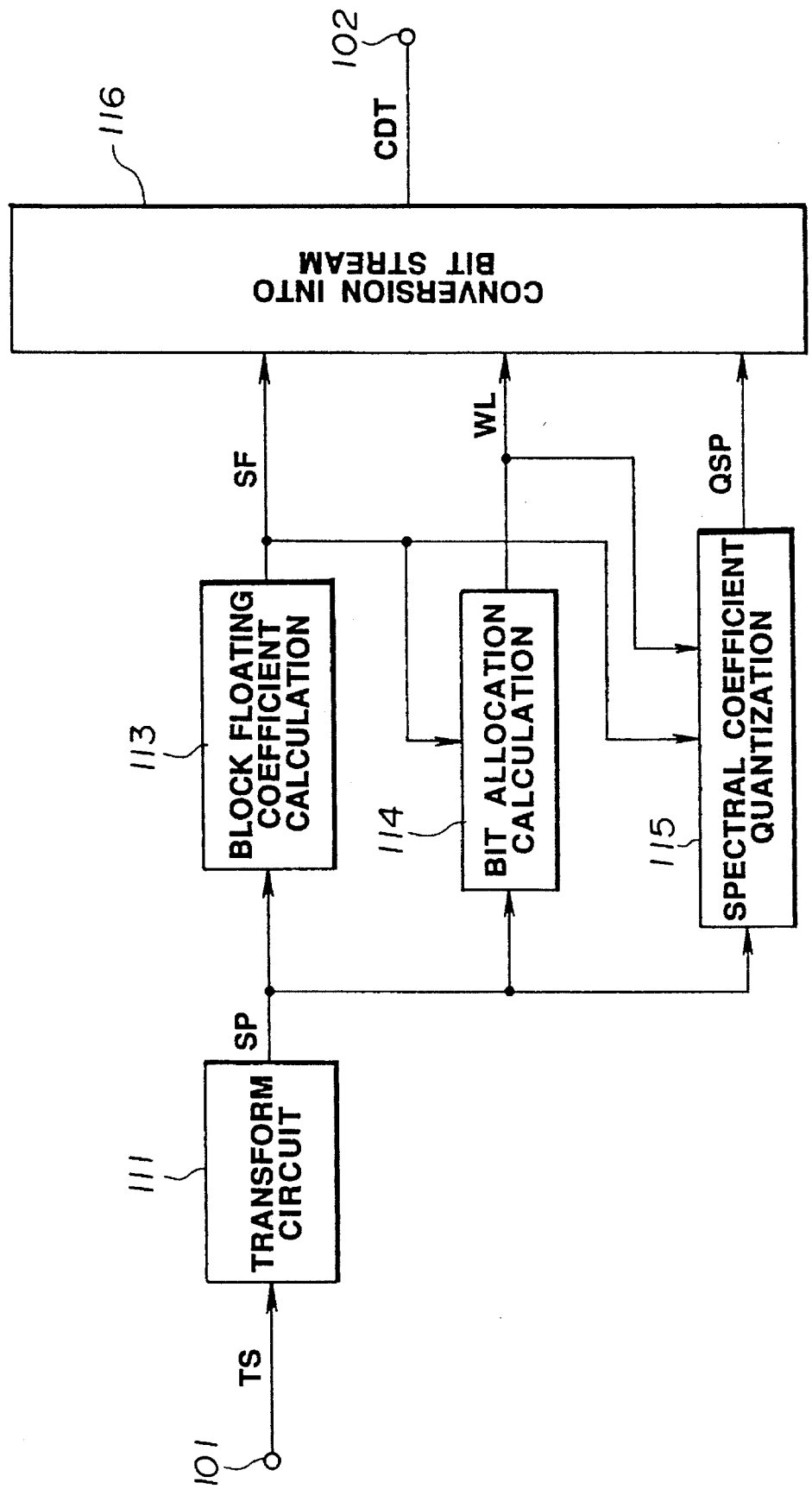
FIG. 9 is a block circuit diagram showing a conventional data compressor arrangement.
Figure 11:
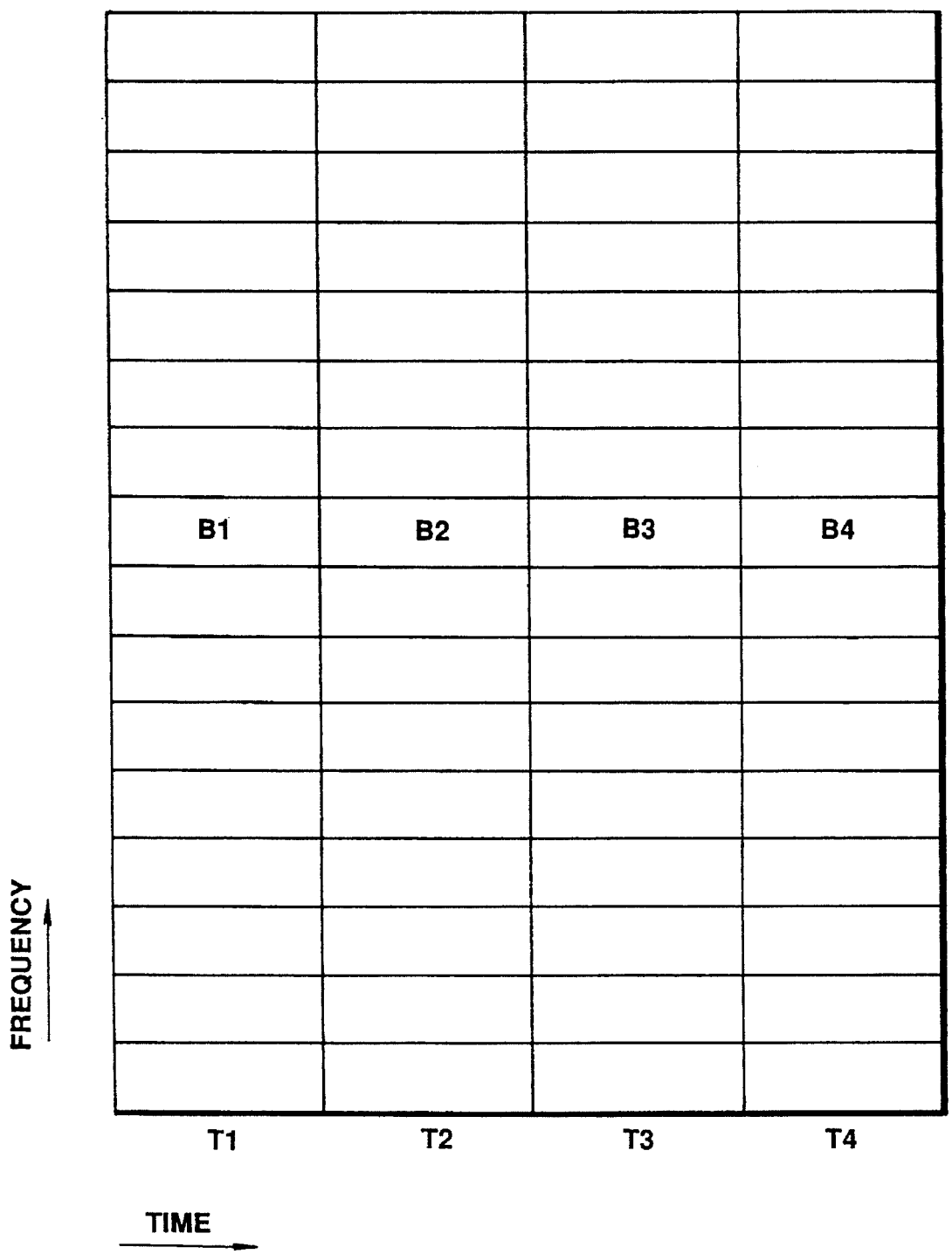
FIG. 11 is a diagrammatic view for explaining the units to which block floating is applied.

FIG. 6 shows a practical arrangement of the bit allocation circuit 14. The spectral coefficients SP are supplied to the terminal 41. The frame length BL is supplied via the terminal 42 to the energy calculating circuit 45. The block floating coefficients SF are supplied via the terminal 43 to the word length calculating circuit 47.

The energy calculating circuit 45 finds the energy distribution of the spectral coefficients SP resulting from transforming with a frame of the input signal having a frame length indicated by the frame length BL. An output of the energy calculating circuit 45 is fed into the allowable noise level calculating circuit 46.

Since the frame length BL is also supplied to the allowable noise level calculating circuit 46, the circuit 46 finds the allowable noise level AN, taking masking into account, for the spectral coefficients SP resulting from transforming with a frame of the input signal having a frame length indicated by the frame length BL. The noise level is calculated in response to the energy distribution as found by the energy calculating circuit 45.

The allowable noise level AN determined by the allowable noise level calculating circuit 46, is stored in the allowable noise level storage circuit 48. The allowable noise level is stored for one frame so that it can be used as the allowable noise level for the previous block when determining the word length, as described above.

The output of the allowable noise quantity calculating circuit 14 for the block in the present frame, i.e., the allowable noise level AN for the block under consideration, and the allowable noise level AN of the block in the frame preceding the present frame, are transmitted to the word length calculating circuit 47. The word length calculating circuit 42 is also supplied via terminal 43 with the block floating coefficients SF from the block floating coefficient calculating circuit 13, and also with the frame length BL. The word length calculating circuit 47 finds, from the allowable noise level AN and from the block floating coefficients SF, for a block having a duration in time indicated by the frame length data BL, the word length w1 indicating the adaptively-allocated number of bits.

Although a system for coding spectral coefficients in the frequency domain resulting from transforming a digital audio input signal in the time domain has been described in the above-described embodiments of the present invention, the present invention may also be applied to a system for applying block floating to a signal in the time domain, such as a sub-band coding system in which a time domain signal is coded after frequency division into sub-bands.

With the above-described digital audio signal processing method of the present invention, adaptive bit allocation to one or more blocks in the present frame is made in response to signal energies or an allowable noise level in the block in at least one past frame preceding or immediately preceding the present frame. Alternatively, a frame including a transient signal is detected, and adaptive bit allocation to one or more blocks in the present frame is made in response to signal energies or an allowable noise level in the block in at least one past frame preceding or immediately preceding the present frame, so that the perception of pre-echo may be reduced, and the sound quality improved.

Also, with the audio data compressing method of the present invention, adaptive bit allocation to one or more blocks in the present frame is made in response to signal energies or an allowed noise level in the blocks in at least one past frame preceding or immediately preceding the present frame, or adaptive bit allocation to one or more blocks of a frame including a transient is made in response to signal energies or an allowable noise level in the blocks in at least one frame preceding or immediately preceding the present frame.

In addition, since the total number of bits allocated for quantizing the at least one block over a time period of several frames is made constant, bit surplus or deficit may be avoided.

In addition, when the total number of bits allocated for quantizing the at least one block over a time period of several frames is made constant, block floating is performed on a variable length time frame. The total number of bits allocated is made constant if a shorter frame is selected, and signal impairment otherwise caused by a constant bit rate may be avoided.

I claim:

1. A signal processing apparatus for compressing a digital input signal to generate a compressed output signal, the apparatus comprising:

input signal dividing means, receiving the digital input signal, for determining a time division of the digital input signal into frames, the frames including a past frame preceding a present frame;

deriving means, receiving the digital input signal, for deriving data divided into blocks from the digital input signal in each of the frames determined by the input signal dividing means, the blocks whereinto the data derived from each of the frames is divided numbering at least one;

block floating means, receiving the blocks of the data from the deriving means, for applying block floating to each thereof to generate respective blocks of floating-processed data from the blocks of the data;

memory means for storing past-frame information;

bit allocation means, receiving the blocks of the data from the deriving means, for calculating an adaptive allocation of quantizing bits for quantizing the blocks of floating-processed data generated from the blocks of the data derived by the deriving means from the digital input signal in the present frame, the bit allocation means calculating the adaptive allocation of quantizing bits from the past-frame information read out from the memory means, the bit allocation means determining the past-frame information from the blocks of the data derived from the digital input signal in the past frame, and storing the past-frame information in the memory means for use in calculating the adaptive allocation of quantizing bits for quantizing the blocks of floating-processed data generated from the blocks of the data derived from the digital input signal in the present frame;

quantizing means, receiving the blocks of floating-processed data from the block floating means and the respective adaptive allocation of quantizing bits from the bit allocation means, for quantizing the blocks of floating-processed data according to the adaptive allocation of quantizing bits to generate respective blocks of quantized data; and bit stream forming means, receiving the blocks of quantized data from the bit allocation means, for forming the compressed output signal from the blocks of quantized data.

2. The signal processing apparatus of claim 1, wherein the bit allocation means comprises:

first determining means, receiving the blocks of the data from the deriving means, for determining respective ones of a signal energy and an allowable noise level for the blocks of the data derived from the digital input signal in the past; and second determining means, receiving from the first determining means the respective ones of the signal energy and the allowable noise level for the blocks of the data derived from the digital input signal in the past frame, and operating in response thereto, for determining respective word lengths for the blocks of the data derived from the digital input signal in the past frame as the past-frame information for storing in the memory means.

3. The signal processing apparatus of claim 1, wherein the bit allocation means includes:

energy determining means, receiving the blocks of the data from the deriving means, for determining respective signal energies for the blocks of the data derived from the digital input signal in each of the frame;

means for storing, in the memory means as the past-frame information, the signal energies determined by the energy determining means for the blocks of the data derived from the digital input signal in the past frame;

means for reading the past-frame information from the memory means;

interpolation means for performing interpolation between:

the signal energies determined by the energy determining means for the blocks of the data derived from the digital input signal in the present frame, and the past-frame information read out from the memory means, to generate energy interpolation information for the present frame; and means, receiving the energy interpolation information for the present frame from the interpolation means, for calculating the adaptive allocation of quantizing bits for quantizing the blocks of floating-processed data generated from the blocks of the data derived from the digital input signal in the present frame.

4. The signal processing apparatus of claims 1, 2, or 3, wherein:

the block floating means is additionally for generating respective block floating coefficients for the blocks of the data derived from the digital input signal in each of the frames; and the bit stream forming means additionally receives the block floating coefficients from the block floating means, and forms the compressed output signal additionally from the block floating coefficients.

5. The signal processing apparatus of claims 1, 2, or 3, wherein the past frame is a frame immediately preceding the present frame.

6. The signal processing apparatus of claim 1, wherein:

the apparatus additionally includes transient detecting means, receiving the digital input signal and operating in response to the input signal dividing means, for monitoring the digital input signal to detect transient frames in which the digital input signal undergoes an abrupt increase in level, and for generating a control signal having first state indicating transient frames, and otherwise having a second state, and the bit allocation means operates in response to the control signal to calculate the adaptive allocation of quantizing bits for quantizing the blocks of floating-processed data generated from the blocks of the data derived from the digital input signal in the present frame from:

the past-frame information read out from the memory means when the control signal is in the first state, and the blocks of the data derived from the digital input signal in the present frame when the control signal is in the second state.

7. The signal processing apparatus of claim 6, wherein:

the block floating means is additionally for generating respective block floating coefficients for the blocks of the data derived from the digital input signal in each of the frames; and the bit stream forming means forms the compressed output signal additionally from the block floating coefficients.

8. The signal processing apparatus of claim 6, wherein the past frame is a frame immediately preceding the present frame.

9. The signal processing apparatus of claims 1 or 6, wherein the deriving means includes transform means for orthogonally transforming each of the frames of the digital input signal to generate the data divided into blocks.

10. The signal processing apparatus of claim 9, wherein the blocks whereinto the data is divided correspond to critical bands.

11. The signal processing apparatus of claims 1 or 6, wherein:

the compressed output signal has a bit rate;

the bit allocation means calculates an adaptive allocation of a number of quantizing bits for quantizing the blocks of the floating-processed data generated from the blocks of the data derived from the digital input signal in each of the frames; and the bit allocation means additionally includes means for controlling the number of quantizing bits to maintain the bit rate of the compressed output signal constant.

12. The signal processing apparatus of claim 11, wherein:

each of the frames whereinto a division of the digital input signal is determined by the input signal dividing means has a frame length, the means for controlling the number of quantizing bits includes means for varying the frame length to control number of quantizing bits.

13. A method for compressing a digital input signal to generate a compressed output signal, the method comprising the steps of:

determining a time division of the digital input signal into frames, the frames including a past frame preceding a present frame;

deriving data divided into blocks from the digital input signal in each of the frames determined in the determining step, the blocks whereinto the data derived from each of the frames is divided numbering at least one;

applying block floating to the blocks of the data derived in the deriving step to generate respective blocks of floating-processed data from the blocks of the data;

calculating an adaptive allocation of quantizing bits for quantizing the blocks of floating-processed data generated from the blocks of the data derived from the digital input signal in the present frame, the adaptive allocation of quantizing bits being calculated from stored past-frame information by steps of:

determining the past-frame information from the blocks of the data derived from the digital input signal in the past frame, and storing the past-frame information;

quantizing the blocks of floating-processed data generated in the step of applying block floating processing from the blocks of the data derived from the digital input signal in the present frame to generate respective blocks of quantized data, the blocks of floating-processed data being quantized according to the adaptive allocation of quantizing bits calculating in the step of calculating an adaptive allocation of quantizing bits; and forming the compressed output signal from the blocks of quantized data generated in the quantizing step.

14. The method of claim 13, wherein the step of determining the past-frame information includes steps of:

determining, from the blocks of the data derived from the digital input signal in the past frame, respective ones of a signal energy and an allowable noise level for the blocks of the data derived from the digital input signal in the past frame; and determining, from the ones of the signal energy and the allowable noise level for the blocks of the data derived from the digital input signal in the past frame, respective word lengths for the blocks of the data derived from the digital signal in the past frame as the past frame information for storing.

15. The method of claim 13, wherein:

the step of determining the past-frame information includes a method additionally comprises the step of determining, from the blocks of the data derived from the digital input signal in the past frame, respective signal energies for the blocks of the data derived from the digital input signal in the past frame as the past-frame information for storing; and the step of calculating an adaptive allocation of quantizing bits includes steps of:
   determining, from the blocks of the data derived from the digital input signal in the present frame, respective present-frame signal energies for the blocks of the data derived from the digital input signal in the present frame,
   performing interpolation between:
      the present-frame signal energies for the blocks of the data derived from the digital input signal in the present frame; and
      the stored past-frame information; to generate energy interpolation information, and
   calculating, from the energy interpolation information, the adaptive bit allocation of quantizing bits for quantizing the blocks of floating-processed data generated from the blocks of the data derived from the digital input signal in the present frame.

16. The method of claims 13, 14, or 15, wherein:

the step of applying block floating additionally generates a block floating coefficient; and in the step of forming the compressed output signal from the blocks of quantized data, the compressed output signal is additionally formed from the block floating coefficient generated in the step of applying block floating.

17. The method of claims 13, 14, or 15, wherein the past frame is a frame immediately preceding the present frame.

18. The method of claim 13, wherein:

the method additionally includes a step of monitoring the frames of the digital input signal determined in the step of determining a time division to detect transient frames, in which the digital input signal undergoes an abrupt increase in level, to generate a control signal having first state indicating transient frames, and otherwise having a second state, and the step of calculating an adaptive allocation of quantizing bits for quantizing the blocks of floating-processed data generated from the blocks of the data derived from the digital input signal in the present frame calculates the adaptive allocation of quantizing bits from:
   the stored past-frame information when the control signal is in the first state, and
   the blocks of the data derived from the digital input signal in the present frame when the control signal is in the second state.

19. The method of claim 18, wherein:

the step of applying block floating additionally generates a block floating coefficient; and in the step of forming the compressed output signal from the blocks of quantized data, the compressed output signal is additionally formed from the block floating coefficient generated in the step of applying block floating.

20. The method of claim 18, wherein the past frame is a frame immediately preceding the present frame.

21. The method of claims 13 or 18, wherein the step of deriving data divided into blocks from the digital input signal includes a step of orthogonally transforming each frame of the digital input signal to generate the data divided into blocks.

22. The method of claim 21, wherein, in the step of deriving data divided into blocks from the digital input signal, the blocks whereinto the data is divided correspond to critical bands.

23. The method of claims 13 or 18, wherein:

the compressed signal has a bit rate;

in the step of calculating an adaptive allocation of quantizing bits, an adaptive allocation of a number of quantizing bits is calculated; and the step of calculating an adaptive allocation of quantizing bits includes a step of controlling the number of quantizing bits to maintain the bit rate of the compressed output signal constant.

24. The method of claim 23, wherein:

in the step of determining a time division of the digital input signal into frames, each of the frames has a frame length;

the step of controlling the number of quantizing bits includes a step of varying the frame length of the frames to control the number of quantizing bits.

25. A method of storing a digital input signal on a recording medium, the method comprising steps of:
   determining a time division of the digital input signal into frames, the frames including a past frame preceding a present frame;
   deriving data divided into blocks from the digital input signal in each of the frames determined in the determining step, the blocks whereinto the data derived from each of the frames is divided numbering at least one;
   applying block floating to the blocks of data derived in the deriving step to generate respective blocks of floating-processed data from the blocks of data;
   calculating an adaptive allocation of quantizing bits for quantizing the blocks of floating-processed data generated from the blocks of the data derived from the digital input signal in the present frame, the adaptive allocation of quantizing bits being calculated from stored past-frame information by steps of:
      determining the past-frame information from the blocks of the data derived from the digital input signal in the past frame, and
      storing the past-frame information;
   quantizing the blocks of floating-processed data generated in the step of applying block floating processing from the blocks of the data derived from the digital input signal in the present frame to generate respective blocks of quantized data, the blocks of floating-processed data being quantized according to the adaptive allocation of quantizing bits calculating in the step of calculating an adaptive allocation of quantizing bits;
   forming the compressed output signal from the blocks of quantized data generated in the quantizing step; and
   recording the compressed output signal on the recording medium.

26. The method of claim 25, wherein the step of determining the past-frame information includes steps of:
   determining, from the blocks of data derived from the digital input signal in the past frame, respective ones of a signal energy and an allowable noise level for the blocks of data derived from the digital input signal in the past frame; and determining, from the ones of the signal energy and the allowable noise level for the blocks of data derived from the digital input signal in the past frame, respective word lengths for the blocks of data derived from the digital signal in the past frame as the past frame information for storing.

27. The method of claim 25, wherein:

the step of determining the past-frame information includes a method additionally comprises the step of determining, from the blocks of the data derived from the digital input signal in the past frame, respective signal energies for the blocks of the data derived from the digital input signal in the past frame as the past-frame information for storing; and the step of calculating an adaptive allocation of quantizing bits includes steps of:
  determining, from the blocks of the data derived from the digital input signal in the present frame, respective present-frame signal energies for the blocks of the data derived from the digital input signal in the present frame,
  performing interpolation between:
    the present-frame signal energies for the blocks of data derived from the digital input signal in the present frame; and
    the stored past-frame information; to generate energy interpolation information, and
  calculating, from the energy interpolation information, the adaptive bit allocation of quantizing bits for quantizing the blocks of floating-processed data generated from the blocks of the data derived from the digital input signal in the present frame.

28. The method of claim 25, wherein:

the method additionally includes a step of monitoring the frames of the digital input signal determined in the step of determining a time division to detect transient frames in which the digital input signal undergoes an abrupt increase in level to generate a control signal having first state indicating transient frames, and otherwise having a second state, and the step of calculating an adaptive allocation of quantizing bits for quantizing the blocks of floating-processed data generated from the blocks of the data derived from the digital input signal in the present frame calculates the adaptive allocation of quantizing bits from:
  the stored past frame information when the control signal is in the first state, and
  the blocks of the data derived from the digital input signal in the present frame when the control signal is in the second state.

29. The method of claims 25 or 28, wherein, in the step of deriving data divided into blocks from the digital input signal includes a step of orthogonally transforming each frame of the digital input signal to generate the data divided into blocks.

30. The method of claim 25, wherein, in the step of providing a recording medium, the recording medium provided is an optical disc.

31. The method of claim 25, wherein, in the step of providing a recording medium, the recording medium includes a semiconductor memory.

32. The method of claim 25, wherein, in the step of providing a recording medium, the recording medium includes a magnetic tape.

* * * * *